United States Patent [19]

Cusack

[11] Patent Number: 5,040,305
[45] Date of Patent: Aug. 20, 1991

[54] APPARATUS FOR LINEAR MEASUREMENTS

[75] Inventor: Robert F. Cusack, Grosse Pointe, Mich.

[73] Assignee: GTE Valenite Corporation, Troy, Mich.

[21] Appl. No.: 175,634

[22] Filed: Mar. 7, 1988

Related U.S. Application Data

[63] Continuation of Ser. No. 80,856, Aug. 3, 1987, abandoned.

[51] Int. Cl.⁵ .............................................. G01B 5/12
[52] U.S. Cl. ..................................... 33/555.1; 33/344
[58] Field of Search ............. 33/178 R, 178 E, 178 F, 33/147 K, 148 R, 172 R, 172 E, 555.1, 544, 542

[56] References Cited

U.S. PATENT DOCUMENTS

| | | |
|---|---|---|
| 2,767,974 | 10/1956 | Ballard et al. . |
| 3,193,938 | 7/1965 | Aller . |
| 3,422,540 | 1/1969 | Worthen . |
| 3,439,761 | 4/1969 | Laimins . |
| 3,576,128 | 4/1971 | Lockery . |
| 3,800,895 | 4/1974 | Gale et al. . |
| 3,864,054 | 2/1975 | Eysel . |
| 3,938,603 | 2/1976 | Shoberg et al. . |
| 3,958,455 | 5/1976 | Russell . |
| 3,977,194 | 8/1976 | Klee et al. . |
| 4,078,314 | 3/1978 | McMurtry . |
| 4,279,079 | 7/1981 | Gamberini et al. . |
| 4,283,941 | 8/1981 | Kutsay . |
| 4,364,280 | 12/1982 | Kutsay . |
| 4,411,326 | 10/1983 | Siegel . |
| 4,447,960 | 5/1984 | Golinelli ............................. 33/178 E |
| 4,553,332 | 11/1985 | Golinelli et al. . |
| 4,559,717 | 12/1985 | Scire et al. . |
| 4,571,839 | 2/1986 | Burton ............................... 33/178 E |
| 4,625,413 | 12/1986 | Possati ........................... 33/178 E X |
| 4,711,037 | 12/1987 | Saadat ............................ 33/178 F X |
| 4,722,142 | 2/1988 | Schmidt ......................... 33/178 E X |

OTHER PUBLICATIONS

"Want to Move Something the Width of a Hair", Wye Creek Designs, Frederick, MD 21701.

Primary Examiner—Harry N. Haroian
Attorney, Agent, or Firm—Bill C. Panagos; Robert E. Walter

[57] ABSTRACT

In an apparatus for making at least one linear measurement, elongated flexure members are positioned to have a movable end move corresponding to the linear dimension being measured. The flexure members are the type utilizing a pair of parallel beams so as to obtain parallel motion and obtain an accurate measurement of the movable end.

5 Claims, 2 Drawing Sheets

APPARATUS FOR LINEAR MEASUREMENTS

This is a continuation of copending application Ser. No. 07/080,856 filed Aug. 3, 1987, now abandoned.

FIELD OF INVENTION

The present invention relates to devices for making precise linear measurements.

BACKGROUND OF INVENTION

Gage devices for making at least one linear measurement desirably minimize friction and contact between moveable parts. Friction causes wear which can result in error. U.S. Pat. No. 3,422,540 to Worthen describes a device utilizing a leaf spring type reed in a gage head which flexes without friction to adjust to work size.

Another desirable feature of a linear measurement device is to provide rectilinear motion. The above described U.S. Patent utilizes a single flexure point and therefore does not achieve true parallel motion. U.S. Pat. No. 3,193,933 describes a drive which uses parallel flexible arms mounted at one end and connected to a support member at the other end to provide rectilinear motion to the support member. This construction typifies a device using a rectangular flexure member with four separate flexures at the corners.

Conventional and current construction of parallel mechanical movements for linear measurement devices has concentrated on multipiece assemblies and one piece assemblies that use four separately machined flexures at the corners of a rectangular-shaped flexure member. The use of four separately machined flexure members introduce error since multiple pieces must be joined and errors attendant with the joining of multiple parts is introduced.

True linear motion in a gaging device is highly desirable for the measurement of very small distances. Any accurate or nonparallel motion can result in measurement inaccuracies which must be corrected.

Flexure devices have been used in various force measurement devices. U.S. Pat. No. 4,559,717 to Scire et al disclose a flexure hinge capable of independent xy motion in a single plane free of pitch, roll, yaw, and of motion perpendicular to the plane of motion. U.S. Pat. No. 3,576,128 to Lockery et al discloses a parallelogram-type beam of the type having two transverse holes connected by a slot so as to provide upper and lower beams. Flexible portions are formed adjacent the top and bottom of the holes. The beams are relatively rigid longtitudinal sections extend between the upper halves of each hole and between the lower halves of each hole. This construction results in substantially linear motion. The strains are measured at selected surface portions of the member to obtain a reading indicative of the force being applied. The device described in Lockery et al is force dependent. The greater the force applied, the greater is the force-induced strains. The device is built to resist the force whereby deflection is proportional to the force applied. Heretofore, devices of the type described are not believed to have been used in devices for making linear measurements.

SUMMARY OF THE INVENTION

It is, therefore, an object of this invention to obviate one or more disadvantages of the prior art.

It is another object of the present invention to make a device of simple construction but having a very high accuracy for making at least one linear measurement.

It is a further object to achieve parallel motion or motion in a plane without roll, yaw and motion perpendicular to the direction of motion.

In accordance with the present invention, there is provided an apparatus for making at least one linear measurement. An elongated flexure member has one end rigidly mounted to a support member and the other end movable from one position to another corresponding to a linear measurement. A transducer is operably associated with the movable end for sensing movement thereof and, in turn, is connected to an indicator means for giving a positive indication of the linear movement of the movable end. The flexure member comprises a body of solid material having substantially parallel surfaces extending lengthwise and separated by a thickness dimension. The pair of spaced-apart circular openings extended thoroughly through the body in a widthwise dimension. Each opening forms a web with a respective surface and communicates with the other circular opening by a slot. The openings and slot form spaced-apart parallel beams whereby the movable end is adapted to move in the direction substantially parallel to the stationary end.

DETAILED DESCRIPTION

For better understanding of the present invention, together with other and further objects, advantages, and capabilities thereof, reference is made to the following disclosure and dependent claims taken in conjunction with the above-described drawings.

Figure 1:
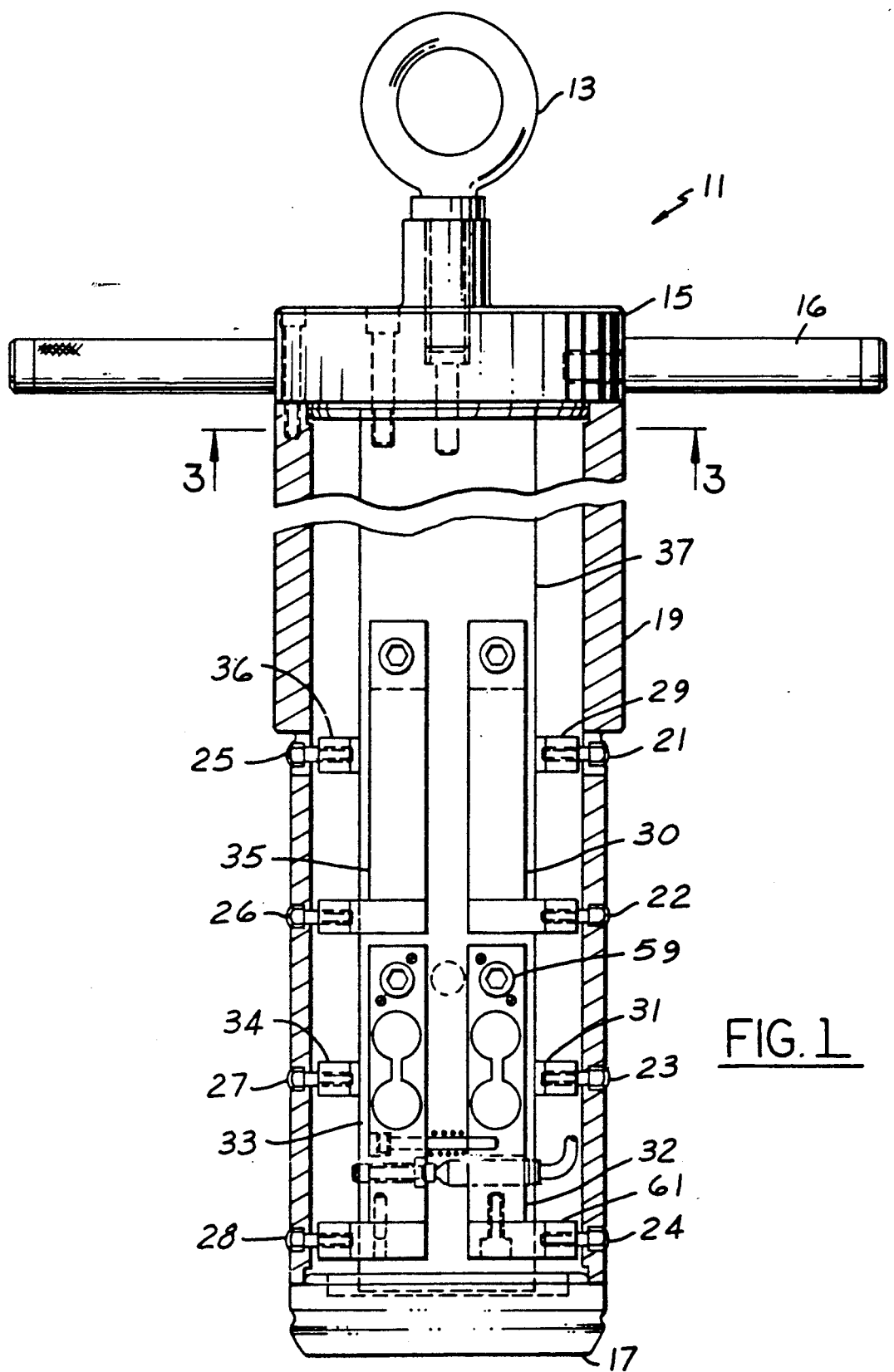
FIG. 1 is a sectional, elevational view of a gage employing the features of the present invention.
Figure 2:
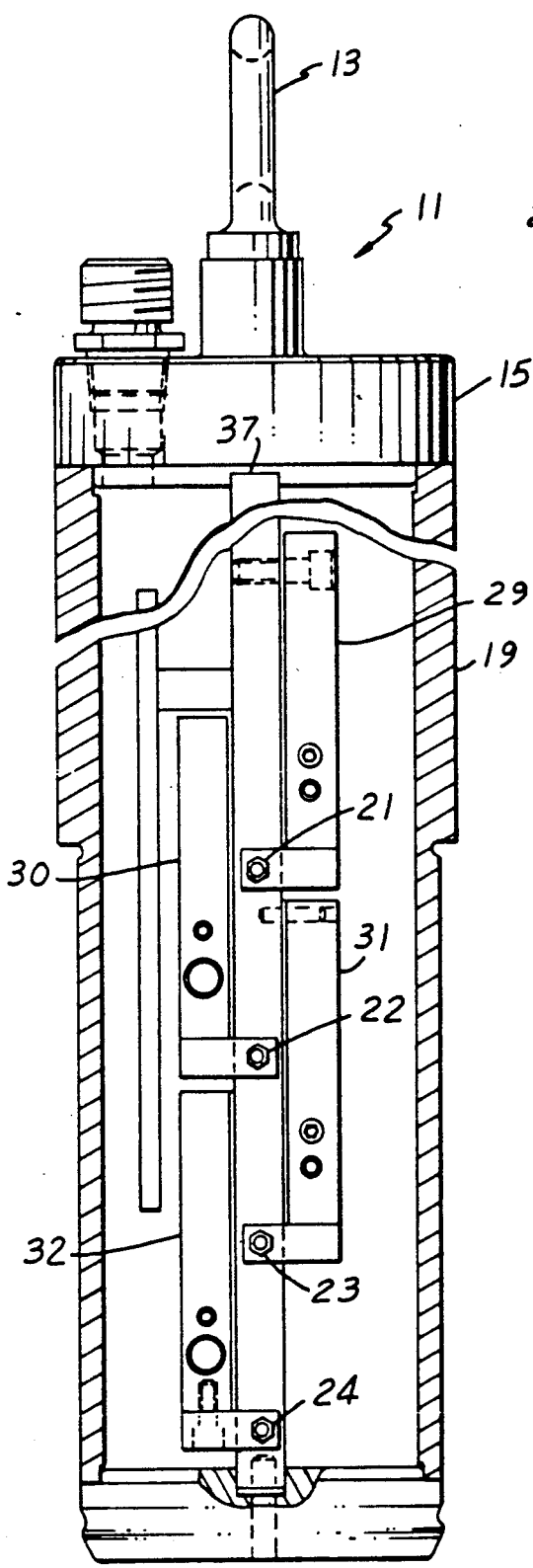
FIG. 2 is a side view, shown in section, of the gage of FIG. 1.
Figure 5:
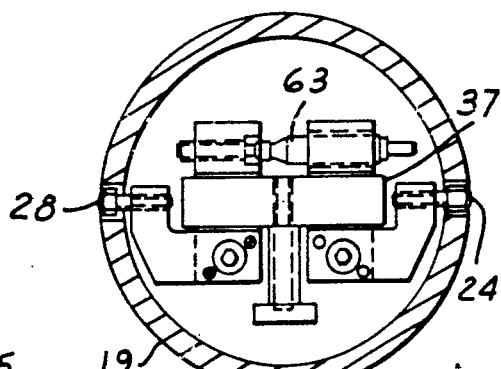
FIG. 5 is a sectional view along 5—5 of FIG. 4.
Figure 3:
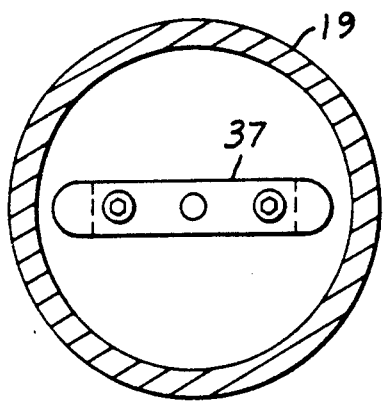
FIG. 3 is an elevational view, in section, along 3—3 of FIG. 1.

Referring now to the drawings with greater particularity, there is shown in FIG. 1, a plug-type gage 11 for measuring the inside of a cylindrical bore. It is contemplated that other measurement devices utilizing the principles of the present invention are within the scope of the invention described.

Generally, the gauge 11 includes a handle 13 at the top which provides for ease of insertion of the gage 11 into a cylindrical bore such as a bore on an automotive engine block. The handle 13 is connected to a top cover 15 which includes a cross member 16. The cross member 17 limits the distance that the gage 11 can be inserted into a bore to be measured. Intermediate the top cover 15 and bottom cover 17, an elongated housing 19 is aligned along an longitudinal axis. In the embodiment shown in the drawings, the housing 19 is in the form of a cylinder and is symmetrical about the longitudinal axis.

In operation, the gauge 11 is inserted into the cylinder bore with laterally projecting contact portions 21-28 extending exterior to the outer cylindrical surface of the housing 19 and being adapted to contact the inside surface of the bore to be measured. The contact portion 21-28 move in response to the surface to be dimensioned which is located exterior to the housing 19. A detector or indicating device, such as a dial or any other type of indicator that can measure axial movement and translate the axial movement to a reading indicative of distances measured is provided.

Each of the contact members 21-28 form a part of or are rigidly but adjustably secured to one of the respective flexure members 29-36. Each of the flexure members 29-36 maintains the position of the respective contact portions 21-28 during movement. As shown in the drawings, plurality of flexure members 29-36 with an associated contact portion 21-28 is provided so that multiple measurements may be made along the inside of a bore.

The mounting arrangement for the flexure members 29-36 as shown in FIG. 1, provides for a plurality of measurements in a direction perpendicular to the longitudinal axis and within a plane including the longitudinal axis. It is contemplated that different arrangements may be provided for the flexure members 29-36. The flexure members 29-36 may be located in such a manner so as to take multiple measurements in different directions depending on the orientation of the desired measurement. In FIG. 1, partition 37 extending interior the housing 19 is fixedly held between the top 15 and bottom cover 17. The partition 37 extends transversely in a plane including the longtitudinal axis. The plurality of sets of flexure members 29-36 are mounted to the partition 37. It is contemplated that additional partitions 37 may be provided so that the flexure members 29-36 can be mounted in different orientations.

As illustrated in the drawings, one end of each of the flexure members 29-36 is fixedly mounted to the partition 37 while the end including the contact portion is freely movable. Each of the flexure members 29-36 extend in an axial direction and are arranged in sets of pairs with the contact portions 21-28 diametrically opposed and extending exterior to the housing 19. The drawing illustrates four sets of flexure members 29-36 whereby the inside measurement of the cylinder bore can be determined along a plane passing through a central axis.

Figure 4:
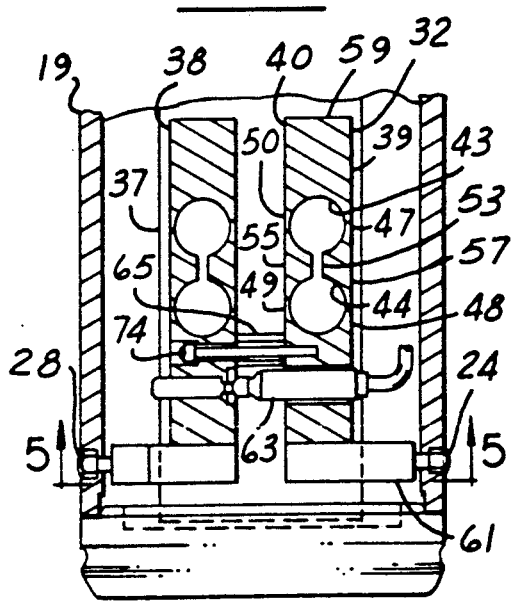
FIG. 4 is an elevational view of the lower part of FIG. 1.

Each of the flexure members 29-36 are similarly constructed so the following detailed discussion of one applies to all of the members. Referring to FIG. 4, the flexure member 32 comprises a body of solid material having parallel surfaces 39-40 extending lengthwise and separated by a thickness dimension. A pair of spaced apart circular openings 43,44 extend entirely through the body of the flexure member 32 in a widthwide dimension. Each of the opening 43,44 forms one of the respective webs 47-50 with a respective surface 39,40 and communicates with the other circularly shaped opening by a slot 53. The holes or openings 43,44 and slot 53 form spaced apart parallel beams 55,57 whereby the movable end moves in the direction substantially parallel to the stationary end.

The flexure member 30 is formed by drilling two holes 43,44 in a rectangular shaped piece of solid material. The two holes 43,44 are preferably of equal diameter and drilled entirely through the width of the bar. A straight slot 53 is machined as by milling to connect the two holes 43,44 to provide an upper beam 55 and a lower beam 57. The slot 53 is such as to provide horizontally extending rigid portions or beams 55,57 between the upper and lower halves of the two holes 43,44. The hole 43 are drilled with their center axis lying in a common plane which is substantially parallel and half way between the top and bottom surfaces 39,40 of the flexure member 30 to produce top webs 49,50 and bottom webs 47,48 of substantially equal thicknesses. The circular-shaped openings 43,44 are disposed inwardly from the ends of the flexure member 30 so that one end 59 can be mounted to partition 37 and the other end 61 can be adapted to include contact portion 24.

Each of the webs 47-50 form a hinge which permits movement of the movable end 61 of the flexure member 30 with respect to the stationary end 59. The thinest section of the web 48 acts as the hinge about an axis extending in the direction of top thickness dimension of the flexure member 30. Typically, the web has a thickness, at its thinest section, of about 0.1 to about 0.3 millimeters or less. The webs 47-50 are sufficiently thin so as to permit movement of the flexure member with the application of very low forces. Due to the location of the webs 57-50, the movable end 61 moves parallel to the stationary end 59. Thus, a linear dimension along a line of direction component of a measurement can be accurately obtained.

A transducer 63 is operably associated with the movable end 61 of the flexure member 30 for sensing movement thereof. As illustrated in FIG. 1, the transducer 63 is mounted between each movable end of a pair of flexure members 32 and 33. According to this arrangement, the relative linear movement between the flexure members 32,33 is precisely measured. It is also contemplated that in other arrangements, the transducer can be mounted between the flexure member 30 and a stationary portion of the housing 19. In this latter case, the movement of the flexure member with respect to the housing 19 is measured. Transducers of the type indicated are commercially available and may be conveniently connected to an indicator (not shown) which gives an indication of the distance as measured.

Since the flexure members 29-36 respond to essentially zero or very low force, they are biased apart by a spring 65 position between the respective movable ends of flexure members 29,30. The relative movement of the movable ends 67,69 is limited by a stop member 71. The stop member 71 comprises a bar mounted perpendicular to the longitudinal axis. One end of the bar is threadedly inserted into one end of one flexure member 32. The other end of the bar passes through an opening in the other flexure member 33 whereby the flexure members 32,33 are freeably movable toward each other. Outward motion of the flexure members 29,30 is limited by the stop 71. Stop 71 is in the form of enlarged end of the bar so as to limit the outward movement of one flexure member with respect to the other.

I claim:

1. A plug gauge for measuring the inside of a cylindrical bore and for making at least one linear measurement, said plug gauge comprising a support member, at least one pair of elongated flexure members, each elongated flexure member having one end rigidly mounted to said support member and the other end movable from one position to another position corresponding to a linear measurement, each flexure member comprising a body of solid material having substantially parallel surfaces extending lengthwise and separated by a thickness dimension, each flexure member additionally including (a) a pair of spaced apart circular openings extending entirely through said body in a widthwise dimension, (b) four webs wherein each opening forms a web with each respective surface and communicates with the other circular opening by a slot, each web having a thickness of from about 100 to about 300 microns,
(c) said openings and slot forming spaced apart parallel beams whereby said movable end is adapted to move in a direction substantially parallel to said stationary end, and
(d) each movable end including a contact portion adapted to be moved along a line perpendicular to said parallel surfaces, said pair of flexure members being mounted at opposing positions on said support member wherein each of said contact portions is adapted to contact the inside diameter of a cylinder bore, a transducer operably associated with each of said movable ends of said pair of elongated flexure members for sensing the relative movement therebetween, and indicator means associated with said transducer for giving an indication of the relative linear movement of said respective movable ends.

2. A gauge for making at least one linear measurement according to claim 1 wherein
each web is sufficiently thin whereby said movable end is adapted to be movable in response to very low forces.

3. A gauge for making at least one linear measurement according to claim 2 wherein
said apparatus comprises a housing,
said support member being rigidly secured to said housing, and
said movable end including a contact portion adapted to be movable along a line perpendicular to said parallel surfaces.

4. A gauge for making at least one linear measurement according to claim 3 including
a stop for limiting the outward motion of said contact portion.

5. A gauge for making at least one linear measurement according to claim 4 wherein
said inward motion of said contact portion is measured.

* * * * *